United States Patent
Lim et al.

(10) Patent No.: US 8,340,158 B2
(45) Date of Patent: Dec. 25, 2012

(54) SYSTEM AND METHOD FOR HUMAN BODY COMMUNICATION USING LIMITED PASSBAND

(75) Inventors: In-Gi Lim, Daejon (KR); Jung-Hwan Hwang, Daejon (KR); Sung-Weon Kang, Daejon (KR); Kyung-Soo Kim, Daejon (KR); Jung-Bum Kim, Daejon (KR); Hyung-Il Park, Daejon (KR); Chang-Hee Hyoung, Daejon (KR); Duck-Gun Park, Daejon (KR); Sung-Eun Kim, Seoul (KR); Jin-Kyung Kim, Daejon (KR); Tae-Joon Kim, Seoul (KR); Jin-Bong Sung, Daejon (KR); Hyuk Kim, Daejon (KR); Ki-Hyuk Park, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 844 days.

(21) Appl. No.: 12/515,052

(22) PCT Filed: Oct. 29, 2007

(86) PCT No.: PCT/KR2007/005344
§ 371 (c)(1),
(2), (4) Date: May 15, 2009

(87) PCT Pub. No.: WO2008/060045
PCT Pub. Date: May 22, 2008

(65) Prior Publication Data
US 2010/0246643 A1    Sep. 30, 2010

(30) Foreign Application Priority Data
Nov. 16, 2006 (KR) .................. 10-2006-0113329

(51) Int. Cl.
*H04B 1/00* (2006.01)

(52) U.S. Cl. .................. 375/140; 375/146; 375/147
(58) Field of Classification Search .................. 375/147, 375/146
See application file for complete search history.

(56) References Cited

U.S. PATENT DOCUMENTS
4,591,854 A    5/1986    Robinson
(Continued)

FOREIGN PATENT DOCUMENTS
JP    2004-364009 A    12/2004
(Continued)

OTHER PUBLICATIONS

T.G. Zimmerman; "Personal Area Networks: Near-field intrabody communication" IBM Systems Journal, vol. 35, Nos. 3&4, 1996, pp. 609-617. International Search Report—mailed Jan. 30, 2008; PCT/KR2007/005344.

*Primary Examiner* — David C. Payne
*Assistant Examiner* — Brian J Stevens
(74) *Attorney, Agent, or Firm* — Ladas & Parry LLP

(57) ABSTRACT

Provided are a system and method for human body communication using a limited passband. The system includes a transmission frame generating unit for human body communication which generates a transmission frame for human body communication based on data information including user identification (ID) and data scrambled into an orthogonal code generated by the user ID; a symbol mapping unit for symbolizing the generated transmission frame for human body communication according to a predetermined modulating method; a spreading unit for spreading the symbol outputted in the symbol mapping unit; a waveform generating unit for generating a baseband signal whose band is limited to a predetermined range with respect to the data spread in the spreading unit; and a middle band transmitting unit for modulating the baseband signal into a predetermined limited passband signal.

19 Claims, 2 Drawing Sheets

U.S. PATENT DOCUMENTS

| | | | |
|---|---|---|---|
| 5,796,827 A | 8/1998 | Coppersmith et al. | |
| 2006/0072524 A1* | 4/2006 | Perahia et al. | 370/338 |
| 2006/0092908 A1 | 5/2006 | Sung et al. | |
| 2006/0189279 A1* | 8/2006 | Kobayashi et al. | 455/101 |
| 2007/0002815 A1* | 1/2007 | Ishibashi et al. | 370/338 |

FOREIGN PATENT DOCUMENTS

| | | |
|---|---|---|
| KR | 10-0272700 B1 | 8/2000 |
| KR | 1020060030926 A | 4/2006 |
| WO | 2005/062236 A2 | 7/2005 |

* cited by examiner

[Fig. 1]
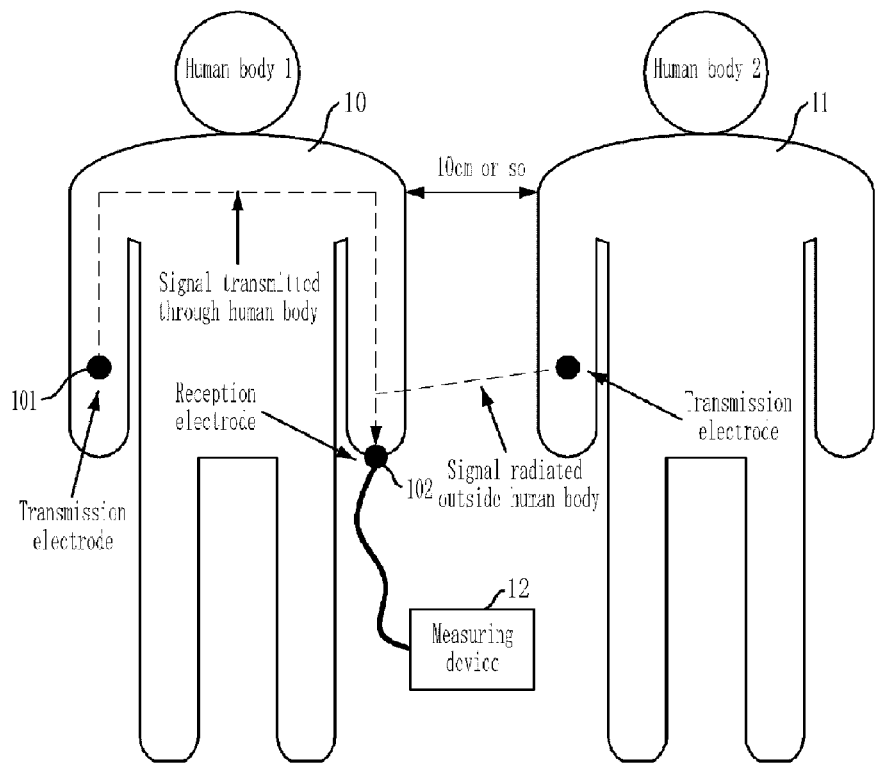
[Fig. 2]
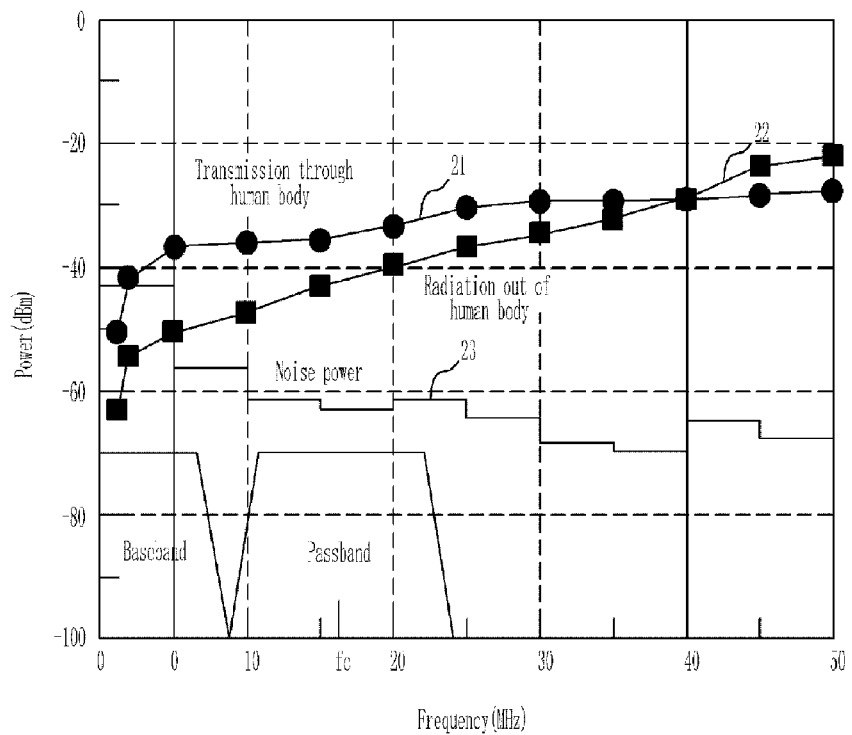

[Fig. 3]
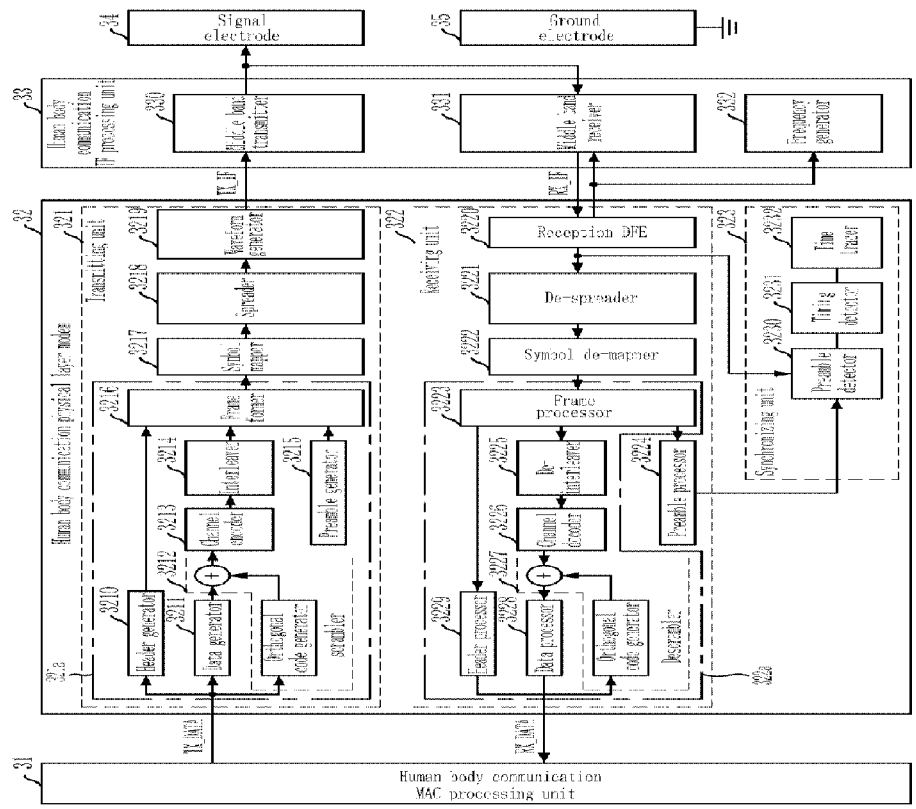
[Fig. 4]
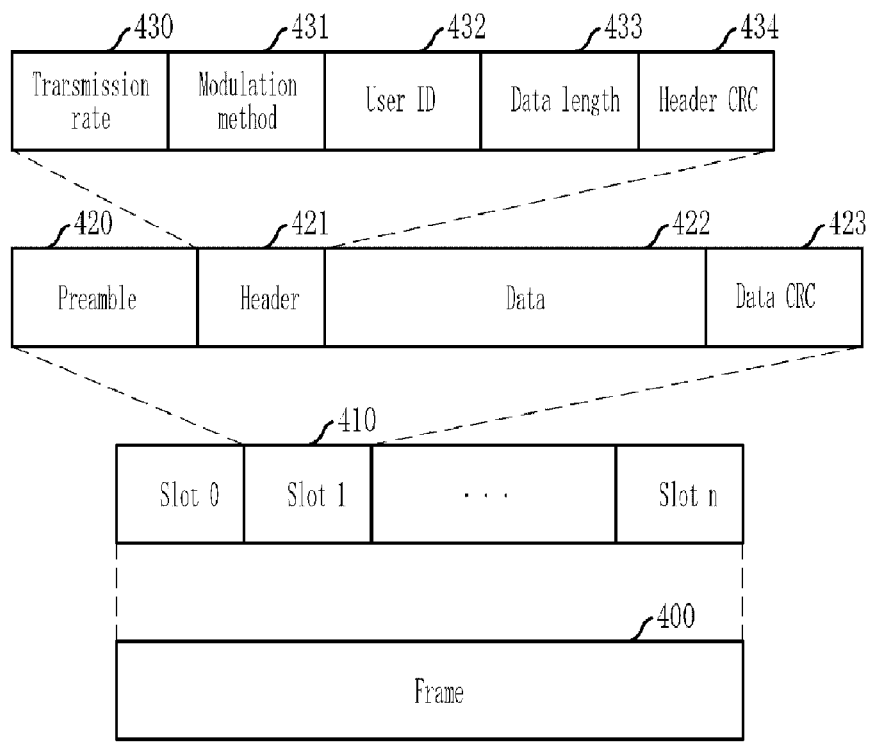

SYSTEM AND METHOD FOR HUMAN BODY COMMUNICATION USING LIMITED PASSBAND

TECHNICAL FIELD

The present invention relates to a system and method for human body communication using a limited passband; and, more particularly, to a system and method for human body communication using a limited passband which allows stable human body communication at low power by limitedly using a frequency band of a signal transmitted through a human body within a frequency band ranging from 5 MHz to 40 MHz for minimizing an effect of interference, e.g., an effect of interference by other users or other electronic devices, while a human body maintains a waveguide characteristic, and by performing data scrambling based on user identification (ID).

This work was supported by the IT R&D program for MIC/IITA [2006-S-072-01, "Controller SoC for Human Body Communications".

BACKGROUND ART

Human body communication means a technology for transmitting a signal between devices which are connected to a human body by using a human body having conductivity as a communication channel. That is, Human body communication means a technology for recovering transmitted information by transmitting information to an electrode of a transmitter attached to one part of a human body by using the human body having conductivity as a communication channel and contacting an electrode of a receiver to the outside of the human body attached to another part of the human body. Through the human body communication technology, communications between diverse portable devices such as Personal Digital Assistant (PDA), laptop computer, digital camera, MP3 player, and mobile phone, or communication with a fixed device such as communications between printers, payment for a credit card, TV reception, communication with an admission system, and payment for bus and metro fare are performed only by simple contact of a user.

A conventional human body communication technology realizes low-speed data communication as slow as tens of Kbps based on a specific frequency such as Frequency Shift Keying (FSK) or Amplitude Shift Keying (ASK). Application of the conventional human body communication technology is limited to a field requiring simple data transmission.

The conventional human body communication technology includes a technology using a photoelectric effect, which is a technology for applying a digital signal of Non Return to Zero (NRZ) directly to a human body and receiving the digital signal of NRZ based on the photoelectric effect. The conventional human body communication technology enables communication of 10 Mbps by remarkably improving transmission speed. The high-speed data transmission can be widely performed in a daily life by extending a limited application field.

In spite of improvement in the communication speed, the conventional technology using the photoelectric effect has a difficulty in adaptation to a small portable device due to a technical problem such as a size of a module, consumption power, and interference by another lighting.

As a method for solving the above problem, technologies using an electronic recovering method are introduced. Since these technologies realize a single chip as well as communication of 2 Mbps, it shows that the technologies are adaptable to diverse electronic devices in daily life.

The technologies using an electronic recovering method may be an optimized technology for realizing a network between diverse sensors adaptable to the human body such as ElectroCardioGraph (ECG), Non-Invasive Blood Pressure (NIBP), and Heart Monitor, and a human body-based network such as a wearable computer, which has not been easily realized.

Since the human body is formed of diverse materials and has diverse formats, low conductivity and high dielectric constant, the human body functions as an antenna in a wide frequency region.

Although it is possible to communicate by using the human body as the antenna due to the above characteristics, a signal of another neighboring user or un-desired noise signals from external electronic devices may be transmitted to the human body. Also, there is a possibility that communication becomes unstable due to the distance between peripheral objects or devices, or the location of the peripheral objects or devices.

A frequency modulating method such as FSK, ASK, and Phase Shift Keying (PSK) selectively uses a region of low external interference and requires a low signal-to-noise rate in realization of communication. However, when the interference occurs, it is difficult to solve the problem.

A method for directly transmitting a digital signal requires a wide band. Also, when characteristics of a reception signal are recovered, strong interferences transmitted from peripheral devices except the signal transmitted from the transmitter are also inputted. When interference occurs within a signal band, a desired signal may not be well divided with no regard to sensitivity of the receiver. A bandwidth larger than tens of MHz is required to directly a digital signal larger than Mbps. When these signals are authorized to the human body, a signal larger than a specific frequency is radiated. Accordingly, although a plurality of users do not contact each other, forming a stable network becomes difficult by generating interference to other users.

Therefore, a method for limiting an occupied frequency of a signal transmitted through the human body within a range of frequency which does not affect neighboring people is suggested for a stable communication among a plurality of neighboring users without interference. When the human body is used as a channel and a usable frequency is limited, a communication speed is remarkably limited. At present, the maximum communication speed realized according to the method is 10 Mbps. In the method, since a transmission signal includes many high-frequency signals, signals of tens of MHz are applied to the human body in consideration of an occupied frequency band. Since these components do not stay in the human body, but are radiated, interference occurs over a neighboring user. That is, since interference is generated between users when a plurality of users exist in a limited space, it is difficult to realize the stable communication in the conventional technology.

DISCLOSURE OF INVENTION

Technical Problem

An embodiment of the present invention is directed to providing a system and method for human body communication using a limited passband which enables stable human body communication at low power by limitedly using a frequency band of a signal transmitted through a human body within a frequency band ranging from 5 MHz to 40 MHz for minimizing an effect of interference, e.g., an effect of interference by other users or other electronic devices, while a human body maintains a waveguide characteristic, and by performing data scramble based on user identification (ID).

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a transmitter using a limited passband in a human body communication system, including: a transmission frame generating unit for human body communication which generates a transmission frame for human body communication based on data information including user identification (ID) and data scrambled into an orthogonal code generated by the user ID; a symbol mapping unit for symbolizing the generated transmission frame for human body communication according to a predetermined modulating method; a spreading unit for spreading the symbol outputted in the symbol mapping unit; a waveform generating unit for generating a baseband signal whose band is limited to a predetermined range with respect to the data spread in the spreading unit; and a middle band transmitting unit for modulating the baseband signal into a predetermined limited passband signal where a human body minimizes an effect of interference while maintaining a waveguide characteristic.

In accordance with another aspect of the present invention, there is provided a receiver in a human body communication system, including: a reception processing unit for demodulating a limited passband signal received through a human body channel into a baseband signal; a de-spreading unit for recovering symbol data by despreading the demodulated reception baseband signal; a symbol de-mapping unit for de-mapping symbol data recovered in the de-spreading unit into a data bit; and a transmission frame processing unit for human body communication which divides the transmission frame for human body communication outputted in the symbol demapping unit into a preamble, a header, and data, extracts user identification (ID) from the header, and de-scrambles the divided data into the orthogonal code generated by the user ID.

In accordance with another aspect of the present invention, there is provided a method for transmitting human body communication data using a limited passband which is applied to a human body communication system, including the steps of: a) receiving data to be transmitted to outside through a human body channel and data information including user identification (ID) from a Medium Access Control (MAC) processing unit; b) scrambling the data by using an orthogonal code generated by the user ID; c) generating a transmission frame for human body communication based on the data information and the scrambled data; d) symbolizing the generated transmission frame for human body communication according to a predetermined modulating method; e) spreading the symbol generated in the step d); and f) generating a passband signal limited within a frequency range where a human body minimizes an effect of interference while maintaining a waveguide characteristic on the data spread in the step e), and transmitting the passband signal to a human body channel.

In accordance with another aspect of the present invention, there is provided a method for receiving human body communication data using a limited passband which is applied to a human body communication system, including the steps of: a) demodulating a limited passband signal received through a human body channel into a baseband signal; b) de-spreading the demodulated reception baseband signal and recovering symbol data; c) de-mapping the symbol data recovered in the step b) into a data bit; d) dividing the transmission frame for human body communication recovered in the step c) into data information and data, and extracting user identification (ID) from the divided data information; and e) generating an orthogonal code by the extracted user ID and de-scrambling and recovering the divided data into the orthogonal code.

The present invention relates to a communication method using a human body as a medium. To be specific, the present invention performs a human body communication which consumes a little energy for information transmission and is strong to external noise by avoiding a frequency band ranging from DC to 5 MHz where noise power around the human body is centralized in comparison with another band, and using a passband limited within a frequency band of 40 MHz where strength of a transmitted signal becomes larger than strength of a radiation signal in the outside of the human body.

Also, although a limited frequency band is used, the present invention performs scrambling on transmission data into a unique PN orthogonal code using user identification (ID) and transmits the transmission data in order to minimize the interference radiated from the neighboring user.

In the present invention, it is possible to combine an interleaver/de-interleaver method for avoiding a frequency band ranging from DC to 5 MHz band for stable communication against interference generated from another electronic devices around the human body and corresponding to channel coding for transmission error correction and a burst error due to external interference. Herein, the frequency band ranging from DC to 5 MHz is a frequency band where interference is centralized and is acquired through many test results. That is, the present invention performs a human body communication by using a limited passband ranging from a 5 MHz band to a 40 MHz band to realize a stable human body communication at low power, and systematically combining scrambling, channel coding, interleaving, and spreading based on user ID.

Advantageous Effects

The present invention enables a stable human body communication by minimizing an effect due to interference between users in an environment that a plurality of users exist and strong interference transmitted from another electronic devices.

That is, the present invention may perform a stable operation against interference by another users or devices, maintain security of data and perform a human body communication at low power in high-speed data transmission using a human body by using a limited passband ranging from a 5 MHz band to a 40 MHz band and efficiently combining technologies such as scrambling of data using user identification (ID), channel encoding and interleaving for preventing error correction and a burst error, and spreading for a processing gain.

BRIEF DESCRIPTION OF THE DRAWINGS

FIG. 1 shows a method for measuring transmission power inside a human body and radiation power outside the human body.

FIG. 2 describes the relation among transmission signal power of each frequency inside a human body, radiation power outside the human body and noise power around the human body according to the measurement method of FIG. 1.

FIG. 3 shows a human body communication system using a limited passband in accordance with an embodiment of the present invention.

FIG. 4 shows a frame for human body communication in accordance with an embodiment of the present invention.

BEST MODE FOR CARRYING OUT THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

FIG. 1 shows a method for measuring transmission power in the inside of a human body and radiation power in the outside of the human body.

A signal transmitted through a transmission electrode 101 attached to a human body 1 10 is received through a reception electrode 102 attached the human body 1 10, which is located in a predetermined distance by using a human body as a medium. The transmission power in the inside of the human body is measured by a measuring device 12.

Since conductivity of the human body is very low, part of a signal transmitted through the human body is radiated outside and interrupts a communication in the inside of the human body of another user. The power of the radiation signal radiated outside the human body is measured by transmitting a signal through a transmission electrode 111 of a human body 2 11, receiving a signal from the reception electrode 102 of the human body 1 10 away from the human body 2 11 as long as a predetermined distance of about 10 cm, and measuring in the measuring device 12 radiation power outside the human body from the signal transmitted from the reception electrode 102 of the human body 1 10.

FIG. 2 describes the relation among transmission signal power of each frequency inside a human body, radiation power outside the human body and noise power around the human body according to the measurement method of FIG. 1.

Referring to FIG. 2, in a frequency band ranging from DC to 40 MHz used in a human body communication, power of a transmission signal in the inside of the human body, i.e., a transmission signal using a human body as a waveguide, is stronger than power of a radiation signal in the outside of the human body, i.e., a radiation signal using a human body as an antenna. In a frequency band larger than 40 MHz, radiation power in the outside of the human body becomes stronger than transmission power in the inside of the human body.

Diverse electromagnetic waves generated in diverse devices existing around the human body, e.g., a vehicle, a fluorescent lamp, a mobile phone, a computer, TV, and a radio set, transmits a signal to the human body and the transmission signal in the inside of the human body functions as an interference signal in communication in the inside of the human body.

Results of measuring interference signals transmitted to the human body in diverse measurement places are acquired and noise power 23 is acquired by adding and averaging the measurement results based on a 5 MHz unit as shown in FIG. 2.

A graph of the noise power 23 in FIG. 2 shows that the largest noise power is generated in a frequency band ranging from DC to 5 MHz.

Therefore, the present invention uses a frequency band ranging from 5 MHz to 40 MHz except a section of the largest noise power where a frequency band ranges from DC to 5 MHz and a section where a frequency band is longer than 40 MHz as a passband. Herein, 40 MHz is a frequency corresponding to a point that reference numbers 21 and 22 of FIG. 2 are crossed. In 40 MHz, the radiation signal power in the outside of the human body becomes larger than the transmission signal power in the inside of the human body. That is, since the present invention uses a frequency band having a good signal-to-noise ratio as the frequency band of the human body communication, the present invention may reduce electromagnetic effect on the human body by using low transmission power and reduce consumption power of a human body communication system, i.e., a transmitting/receiving device. Also, since the radiation signal power in the outside of the human body is small, the present invention is useful to secure transmission data.

FIG. 3 shows a human body communication system using a limited passband in accordance with an embodiment of the present invention. In FIG. 3, a human body communication method, i.e., a transmission/reception method, applied to the human body communication system according to the present invention will be described.

The human body communication system, i.e., a transmitter/receiver, includes a human body communication Medium Access Control (MAC) processing unit 31, a human body communication physical layer modem 32, a human body communication Intermediate Frequency (IF) processing unit 33, a signal electrode 34, and a ground electrode 35. The human body communication MAC processing unit 31 transmits data to be transmitted and data information to a transmitting unit 321 in the human body communication physical layer modem 32 and receives and processes the data received by a receiving unit 322 and data information.

To have a look at the transmitter of the human body communication system, the transmitter includes a transmission processing function of the human body communication MAC processing unit 31, the transmitting unit 321 of the human body communication physical layer modem 32, and a middle band transmitter 330 of the human body communication IF processing unit 33. In particular, the transmitting unit 321 of the human body communication physical layer modem 32 includes a preamble generator 3215, a header generator 3210, a data generator 3211, a scrambler 3212, a channel encoder 3213, an interleaver 3214, a frame former 3216, a symbol mapper 3217, a spreader 3218, and a waveform generator 3219. Herein, a transmission frame generating unit 321a for a human body communication includes the header generator 3210, the data generator 3211, the scrambler 3212, the channel encoder 3213, the interleaver 3214, the preamble generator 3215, and the frame former 3216. The transmission frame generating unit 321a for human body communication generates a transmission frame for human body communication based on data information including user ID and data scrambled as the orthogonal code generated by the user ID. Each constituent element will be described hereinafter.

The preamble generator 3215 is set up as an initial value known to all users and generates a preamble for synchronizing a frame of a predetermined length.

The header generator 3210 performs Cyclic Redundancy Check (CRC) by receiving the data information including a transmission rate, a modulating method, user ID, a data length, which is transmitted from the human body communication MAC processing unit 31 and generates a header of a format as shown in FIG. 4 and a header of a frame for human body communication.

The data generator 3211 receives the data transmitted from the human body communication MAC processing unit 31 and outputs the data at a desired time. The scrambler 3212 includes an orthogonal code generator and an exclusive or (XOR) logic gate. The orthogonal code generator is initialized by the user ID and outputs a PN orthogonal code. The XOR logic gate completes data scrambling through XOR operation on an output of the data generator 3211.

The channel encoder 3213 performs channel encoding on the data generated through the above procedure and the channel encoded signal is interleaved by the interleaver 3214. An object of channel encoding and interleaving is to disperse and correct the burst error generated due to peripheral interference.

The frame former 3216 includes a preamble, a header, and channel encoded/interleaved data and generates a transmission frame for human body communication as shown in FIG. 4. The generated frame is symbolized according to a modulating method desired in the symbol mapper 3217, e.g., BPSK and QPSK. The symbol is inputted to the spreader 3218 and time-axis spreading or frequency-axis spreading are performed. It is possible to acquire an enough process gain through the above spreading procedure. The spreader 3218 may use both or one of time-axis spreading and frequency-axis spreading in the limited passband.

The waveform generator 3219 includes a pulse shaping filter and outputs a baseband signal TX_IF whose band is limited on spread data. The TX_IF signal is modulated into and outputted as a limited passband signal, which is inputted to the middle band transmitter 330. That is, the TX_IF signal is a predetermined limited passband signal that a human body can minimize an effect of interference while maintaining a waveguide characteristic. The TX_IF signal ranges from 5 MHz to 40 MHz. The passband signal is transmitted to the inside of the human body through the signal electrode 34. The ground electrode 35 provides a reference electric potential such as a ground of the human body communication system, i.e., the transmitter/receiver.

Referring to the receiver of the human body communication system, the receiver includes a middle band receiver 331 and a frequency generator 332 of the human body communication IF processing unit 33, the receiving unit 322 and a synchronizing unit 323 of the human body communication physical layer modem 32, and a receiving process function of the human body communication MAC processing unit 31.

In particular, the receiving unit 322 of the human body communication physical layer modem 32 includes a reception digital front end (DFE) 3220, a de-spreader 3221, a symbol de-mapper 3222, a frame processor 3223, a preamble processor 3224, a deinterleaver 3225, a channel decoder 3226, a de-scrambler 3227, a data processor 3228, and a header processor 3229.

A transmission frame processing unit 322a for human body communication includes the frame processor 3223, the de-interleaver 3225, the channel decoder 3226, the descrambler 3227, the data processor 3228, and the header processor 3229.

The transmission frame processing unit 322a divides a transmission frame for human body communication outputted in the symbol de-mapper 3222 into a preamble, a header, and data, extracts user ID from the header, and performs de-scrambling on the divided data into the orthogonal code generated by the user ID.

The reception signal inputted through the signal electrode 34 is inputted to the middle band receiver 331, demodulated into the baseband signal RX_IF, and inputted to the reception DFE 3220. The reception DFE performs reception automatic gain control, DC offset control, and frequency offset control, completes the gain control and DC offset control by performing feedback on the automatic gain control signal and DC offset control signal into the middle band receiver 331, and completes the frequency offset control by performing feedback on the frequency offset control signal into the frequency generator 332.

A reception processing unit includes the middle band receiver 331, the frequency generator 332, and the reception DFE 3220, and demodulates the limited passband signal received through the human body channel into a baseband signal. A preamble detector 3230 of the synchronizing unit 323 before synchronizing a frame receives a reception signal, which is an output of the reception DFE 3220, detects a preamble, and detects an exact frame start time. A timing detector 3231 performs exact timing synchronizing and a time tracer 3232 corrects timing offset of a reception signal.

After synchronization, the baseband signal RX_IF going through the reception DFE 3220 is inputted and de-spread to the de-spreader 3221. A de-spread result is inputted to the symbol de-mapper 3222 and de-mapped as a data bit.

The frame processor 3223 divides the de-mapped frame into a preamble, a header, and data.

After synchronization, the preamble divided in the frame processor 3223 is inputted to the preamble detector 3230, the timing detector 3231, and the time tracer 3232 of the synchronizing unit 323 through the preamble processor 3224. The preamble detector 3230 redetects an exact frame start time, and the timing detector 3231 reperforms exact timing synchronizing. The time tracer 3232 re-corrects timing offset of the reception signal.

When the header outputted from the frame processor 3223 is inputted to the header processor 3229, the header processor 3229 performs CRC decoding, extracts and transmits reception signal data information to the human body communication MAC processing unit 31. The data among the outputs of the frame processor 3223 are interleaved in the de-interleaver 3225. An error generated in the channel decoder 3226 during transmission is corrected.

The data outputted in the channel decoder 3226 are de-scrambled into the PN orthogonal code generated by the user ID in the de-scrambler 3227. That is, the descrambler 3227 is initialized by the user ID and completes de-scrambling by performing an XOR operation on the orthogonal code generator for generating an orthogonal code, the generated orthogonal code, and the outputs of the channel decoder 3226. The user ID is extracted from the header processor 3229.

The de-scrambled reception data are inputted and processed in the data processor 3228, and transmitted to the human body communication MAC processing unit 31 through a register.

FIG. 4 shows a frame for human body communication in accordance with an embodiment of the present invention.

Referring to FIG. 4, a frame 400 for human body communication includes a plurality of slots 410 of a predetermined length. One or a plurality of slots include a preamble 420, a header 421, data 422, and a data CRC 423. The header 421 includes data information such as a transmission speed 430 of data to be transmitted, a modulating method 431, user ID 432, and a data length 433, and a header CRC output value 434.

As described above, the technology of the present invention can be realized as a program and stored in a computerreadable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean Patent Application No. 2006-0113329, filed in the Korean Intellectual Property Office on Nov. 16, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A transmitter using a limited passband for a human body communication system, comprising:
   a transmission frame generating means for human body communication which generates a transmission frame for human body communication based on data information including user identification (ID) and data scrambled into an orthogonal code generated by the user ID;
   a symbol mapping means for symbolizing the generated transmission frame for human body communication according to a predetermined modulating method;
   a spreading means for spreading the symbol outputted in the symbol mapping means;
   a waveform generating means for generating a baseband signal whose band is limited to a predetermined range with respect to the data spread in the spreading means; and
   a middle band transmitting means for modulating the baseband signal into a predetermined limited passband signal within a predetermined range while maintaining a waveguide characteristic, and
   wherein the modulate and limited passband signal is transmitted within the predetermined frequency range except the predetermined frequency range having a highest affect of interference from other electronic devices.

2. The transmitter of claim 1, wherein the transmission frame generating means for human body communication includes:
   a preamble generator for generating a preamble for timing synchronization;
   a header generator for receiving data information including a transmission speed, a modulating method, user ID, and a data length transmitted from a Medium Access Control (MAC) processing unit, performing Cyclic Redundancy Check (CRC) and generating a header of the transmission frame;
   a data generator for receiving the data transmitted from the MAC processing unit and outputting the data at a predetermined time;
   a scrambler for performing data scrambling based on the orthogonal code generated by the user ID of the data information; and
   a frame former for generating the transmission frame for human body communication based on the generated header, the scrambled data, and the generated preamble.

3. The transmitter of claim 2, further comprising:
   a channel encoding means for performing channel encoding on the scrambled data before generating the transmission frame for human body communication in the frame former.

4. The transmitter of claim 3, further comprising:
   an interleaving means for interleaving channel encoded data in the channel encoding means.

5. The transmitter of claim 2, wherein the header generator includes a data transmission rate, a modulating method, user ID, a data length, and a CRC value of the data transmission rate, the modulating method, the user ID, and the data length.

6. The transmitter of claim 1, wherein the spreading means spreads a symbol outputted in the symbol mapping means in a time domain or a frequency domain.

7. The transmitter of claim 1, wherein the middle band transmitting means modulates the baseband signal into a signal within the predetermined range of 5 MHz to 40 MHz.

8. A receiver in a human body communication system, comprising:
   a reception processing means for demodulating a limited passband signal received through a human body channel into a baseband signal;
   a de-spreading means for recovering symbol data by de-spreading the demodulated reception baseband signal;
   a symbol de-mapping means for de-mapping symbol data recovered in the de-spreading means into a data bit; and
   a transmission frame processing means for human body communication which divides the transmission frame for human body communication outputted in the symbol de-mapping means into a preamble, a header, and data, extracts user identification (ID) from the header, and de-scrambles the divided data into the orthogonal code generated by the user ID,
   wherein the reception processing means includes:
   a middle band receiver for demodulating a middle band reception signal received through the human body channel and converting the middle band reception signal into a baseband signal; and
   a reception digital front end (DFE) for performing reception gain control, DC offset control, and frequency offset control through a reception signal of the baseband outputted in the middle band receiver.

9. The receiver of claim 8, wherein the transmission frame processing means for the human body communication includes:
   a frame processor for dividing the transmission frame for human body communication outputted in the symbol de-mapping means into a preamble, a header, and data;
   a header processor for performing Cyclic Redundancy Check (CRC) decoding on data information included in the divided header and transmitting the data information to a Medium Access Control (MAC) processing unit;
   a de-scrambler for de-scrambling the data divided in the frame processor into the orthogonal code generated by the user ID among the data information; and
   a data processor for transmitting the de-scrambled data to the MAC processing unit.

10. The receiver of claim 9, further comprising:
    a de-interleaving means for de-interleaving the data divided in the frame processor.

11. The receiver of claim 10, further comprising:
    a channel decoding means for performing channel decoding on the data de-interleaved in the de-interleaving means.

12. The receiver of claim 8, further comprising:
    a synchronizing means for performing frame start time detection, timing synchronization, and timing offset correction by detecting a preamble from a reception signal outputted from the reception digital front end (DFE).

13. The receiver of claim 12, further comprising:
a preamble processing means for transmitting the preamble divided in the transmission frame processing means for human body communication to the synchronizing means,
where the synchronizing means re-performs frame start time detection, timing synchronization, and timing offset correction based on the transmitted preamble.

14. A method for transmitting human body communication data using a limited passband which is applied to a human body communication system, comprising the steps of:
providing a processor and a memory, the memory having stored thereon:
a) receiving data to be transmitted to outside through a human body channel and data information including user identification (ID) from a Medium Access Control (MAC) processing unit;
b) scrambling the data by using an orthogonal code generated by the user ID;
c) generating a transmission frame for human body communication based on the data information and the scrambled data;
d) symbolizing the generated transmission frame for human body communication according to a predetermined modulating method;
e) spreading the symbol generated in the step d); and
f) generating a passband signal limited within a frequency range where a human body minimizes an effect of interference while maintaining a waveguide characteristic on the data spread in the step e), and transmitting the passband signal to a human body channel, and
wherein the generated and limited passband signal is transmitted in the frequency range except the frequency range having a highest affect of interference from other electronic devices.

15. The method of claim 14, further comprising the step of:
g) performing channel encoding and interleaving on the data information and the scrambled data before generating a transmission frame for human body communication in the step c).

16. The method of claim 14, wherein in the step f), a passband signal limited to a range of 5 MHz to 40 MHz with respect to the data spread in the step e) is generated.

17. A method for receiving human body communication data using a limited passband which is applied to a human body communication system, comprising:
providing a processor and a memory, the memory having stored thereon:
a) demodulating a limited passband signal received through a human body channel into a baseband signal,
wherein the received and limited passband signal is received from a first device transmitting the limited passband signal within a predetermined frequency range except the predetermined frequency range having a highest affect of interference from other electronic devices and
wherein the received signal is transmitted within the predetermined frequency range from the first device while the first devices maintains a waveguide characteristic;
b) de-spreading the demodulated reception baseband signal and recovering symbol data;
c) de-mapping the symbol data recovered in the step b) into data bits;
d) dividing the transmission frame for human body communication recovered in the step c) into data information and data, and extracting user identification (ID) from the divided data information; and
e) generating an orthogonal code by the extracted user ID and de-scrambling and recovering the divided data into the orthogonal code.

18. The method of claim 17, further comprising:
f) transmitting the divided data information and the de-scrambled data to a Medium Access Control (MAC) processing unit.

19. The method of claim 17, further comprising:
g) performing de-interleaving and channel decoding on the data acquired in the step d).

* * * * *